United States Patent
Ruan et al.

(10) Patent No.: US 9,367,762 B2
(45) Date of Patent: Jun. 14, 2016

(54) IMAGE PROCESSING DEVICE AND METHOD, AND COMPUTER READABLE MEDIUM

(71) Applicant: OMRON Corporation, Kyoto (JP)

(72) Inventors: Xiang Ruan, Otsu (JP); Huchuan Lu, Dalian (CN); Lihe Zhang, Dalian (CN); Xiaohui Li, Dalian (CN)

(73) Assignee: OMRON CORPORATION, Kyoto-shi (JP)

( * ) Notice: Subject to any disclaimer, the term of this patent is extended or adjusted under 35 U.S.C. 154(b) by 45 days.

(21) Appl. No.: 14/551,810

(22) Filed: Nov. 24, 2014

(65) Prior Publication Data

US 2015/0154471 A1 Jun. 4, 2015

(30) Foreign Application Priority Data

Dec. 2, 2013 (JP) ................................. 2013-249605

(51) Int. Cl.
- *G06K 9/62* (2006.01)
- *G06K 9/46* (2006.01)
- *G06K 9/32* (2006.01)
- *G06K 9/38* (2006.01)

(52) U.S. Cl.
CPC ............ *G06K 9/6201* (2013.01); *G06K 9/3233* (2013.01); *G06K 9/38* (2013.01); *G06K 9/4671* (2013.01); *G06K 9/4676* (2013.01); *G06K 9/629* (2013.01)

(58) Field of Classification Search
None
See application file for complete search history.

(56) References Cited

U.S. PATENT DOCUMENTS

| | | | | |
|---|---|---|---|---|
| 2009/0290794 A1* | 11/2009 | Marchesotti | ......... | G06K 9/4671 382/173 |
| 2010/0305755 A1* | 12/2010 | Heracles | ............. | G06K 9/4671 700/253 |
| 2011/0007940 A1* | 1/2011 | Hamza et al. | ........ | G06K 9/0063 382/103 |
| 2011/0311129 A1* | 12/2011 | Milanfar et al. | ... | G06K 9/00335 382/154 |
| 2012/0294476 A1* | 11/2012 | Wei et al. | ............. | G06K 9/3233 382/103 |

(Continued)

FOREIGN PATENT DOCUMENTS

| | | |
|---|---|---|
| JP | 2001-236508 A | 8/2001 |
| JP | 2010-258914 A | 11/2010 |

OTHER PUBLICATIONS

Wei et al, Geodesic Saliency Using Background Priors, 2012, In Computer Vision—ECCV 2012, pp. 1-14.*

(Continued)

*Primary Examiner* — David F Dunphy
(74) *Attorney, Agent, or Firm* — Nutter McClennen & Fish LLP; John J. Penny, Jr.

(57) ABSTRACT

An image processing device and a method performed by a computer, the image processing device comprising: a processing unit configured to operate as an image acquisition unit configured to acquire an image; a similarity map generator configured to calculate, with a region constructed with one or a plurality of pixels in the image as a constituent unit, a first similarity map based on a first algorithm, the first similarity map representing a degree of similarity between the region and a marginal region of the image, and calculate a second similarity map based on a second algorithm, the second similarity map representing a degree of similarity between the region and the marginal region of the image; and a saliency map generator configured to integrate the first similarity map and the second similarity map to generate a saliency map.

13 Claims, 10 Drawing Sheets

(56) References Cited

U.S. PATENT DOCUMENTS

| | | | | |
|---|---|---|---|---|
| 2013/0223740 | A1* | 8/2013 | Wang et al. | G06T 7/0083 382/171 |
| 2014/0064580 | A1* | 3/2014 | Madabhushi et al. | G06T 7/0012 382/128 |

OTHER PUBLICATIONS

Jiang, H., et al., "Salient Object Detection: A Discriminative Regional Feature Integration Approach," IEEE Computer Society Conference on Computer Vision and Pattern Recognition; Proceedings, IEEE Computer Society, US, Jun. 23, 2013; pp. 2083-2090.

Li, X., et al., "Saliency Detection via Dense and Sparse Reconstruction," 2013 IEEE International Conference on Computer Vision, IEEE, Dec. 6, 2013, pp. 2976-2983.

Yang, C., et al, "Saliency Detection via Graph-Based Manifold Ranking," IEEE Computer Society Conference on Computer Vision and Pattern Recognition, Proceedings, IEEE Computer Society, US, Jun. 23, 2013, pp. 3166-3173.

Kim, J., et al., "A Novel Method for Salient Object Detection via Compactness Measurement," 2013 IEEE International Conference on Image Processing, IEEE, Sep. 15, 2013, pp. 3426-3430.

Yichen, W., et al., "Geodesic Saliency Using Background Priors," Computer Vision—ECCV, 2012, vol. 7574; Lecture Notes in Computer Science, pp. 29-42.

Roy, S., et al., "Spatial Variance of Color and Boundary Statistics for Salient Object Detection," 2013 Fourth National Conference on Computer Vision, Pattern Recognition, Image Processing and Graphics, IEEE, Dec. 18, 2013, pp. 1-4.

Jiang, B., et al., "Saliency Detection via Absorbing Markov Chain," 2013 IEEE International Conference on Computer Vision, IEEE, Dec. 4, 2013, pp. 1665-1672.

Partial European Search Report for Application No. 14194331.6, issued Oct. 12, 2015. (9 pages).

\* cited by examiner

FIG. 3A
Input image
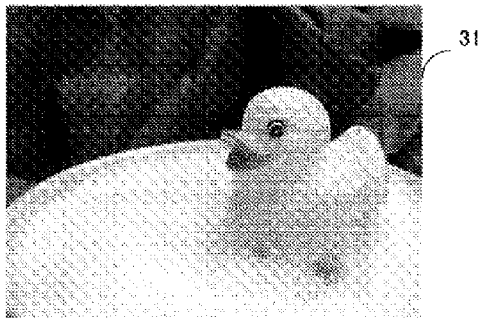
FIG. 3B
Superpixel image
Plural images having different resolutions
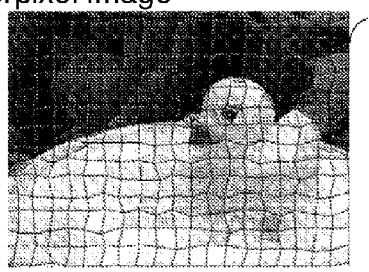
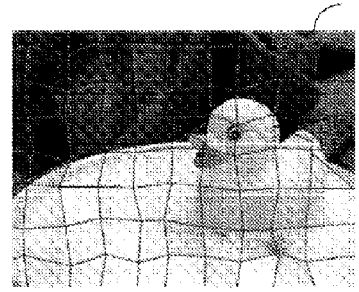
FIG. 3C
Marginal region image
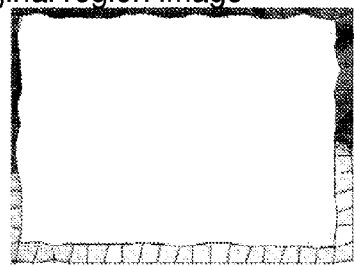
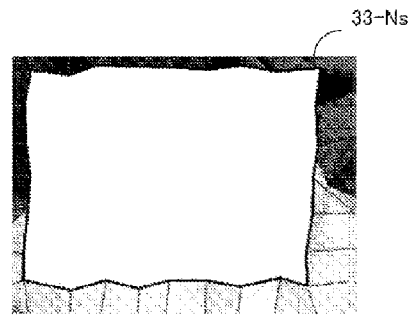

FIG. 4A
Original image
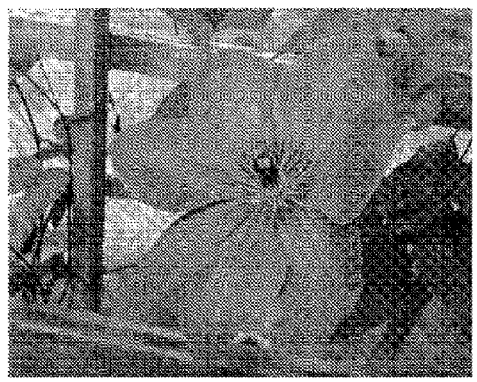 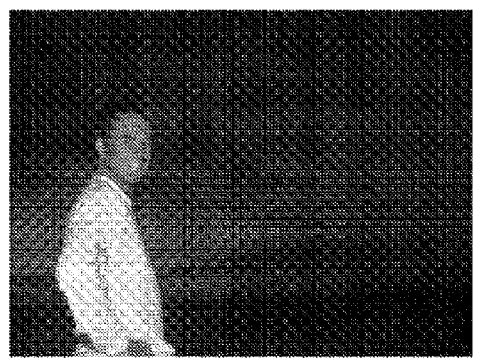
FIG. 4B
Dense recovery error
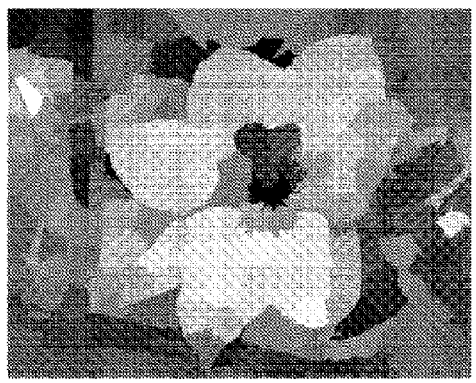 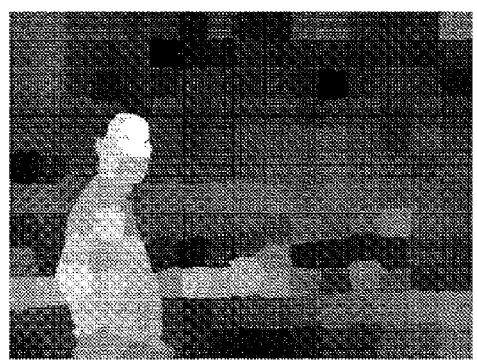
FIG. 4C
Sparse recovery error
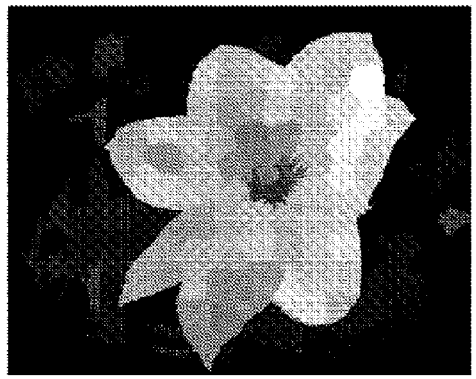 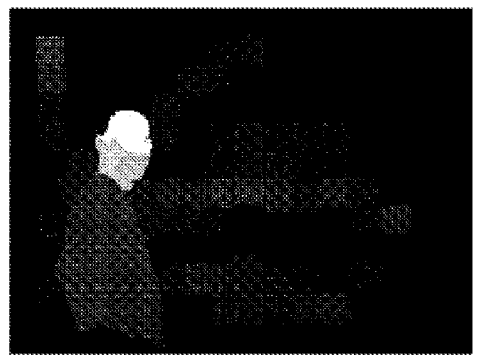

Original image

Dense recovery error map
(before smoothing)

Dense recovery error map
(after smoothing)

Sparse recovery error map
(before smoothing)

Sparse recovery error map
(after smoothing)

Original image

Dense recovery error map
(simple average)

Dense recovery error map
(weighted average)

Sparse recovery error map
(simple average)

Sparse recovery error map
(weighted average)

FIG. 8A Original image
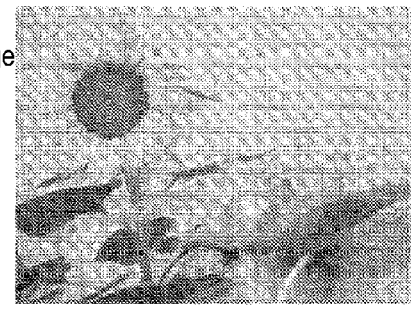
FIG. 8B Dense recovery error map (before correction)
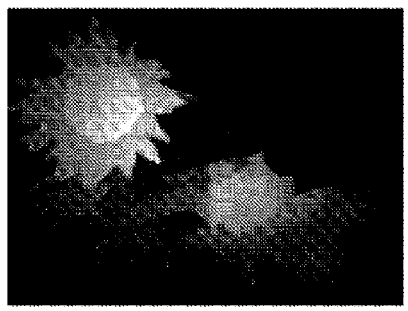
FIG. 8C Sparse recovery error map (before correction)
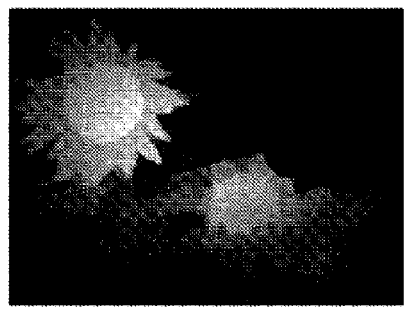
FIG. 8D Object bias Gaussian filter (dense recovery error map)
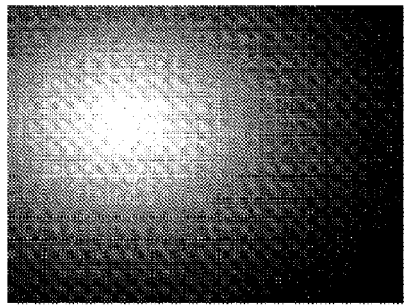
FIG. 8E Object bias Gaussian filter (sparse recovery error map)
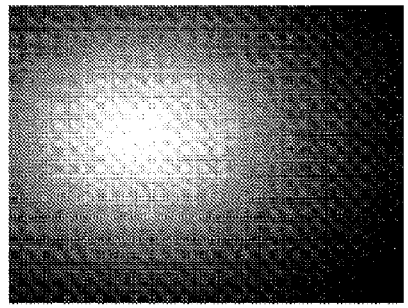
FIG. 8F Dense recovery error map (after correction)
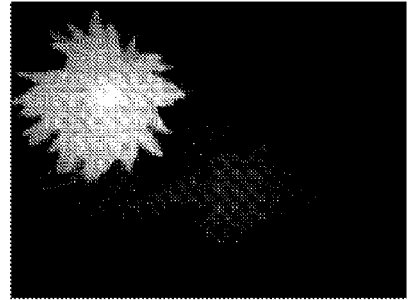
FIG. 8G Sparse recovery error map (after correction)
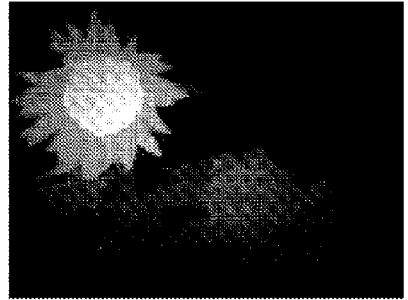

IMAGE PROCESSING DEVICE AND METHOD, AND COMPUTER READABLE MEDIUM

CROSS-REFERENCE TO RELATED APPLICATION

This application is based on Japanese Patent Application No. 2013-249605 filed with the Japan Patent Office on Dec. 2, 2013, the entire contents of which are incorporated herein by reference.

FIELD

The present invention relates to a technology of generating a saliency map in an image.

BACKGROUND

Conventionally, in the field of image processing, there is well known a technology of detecting (extracting) an image region to which a human is expected to pay attention in the image or a noteworthy image region (hereinafter each image region is referred to as a salient region) from the image. Using a salient region detecting technology, a saliency measure of each pixel in the image is calculated, and a saliency map indicating the saliency measure of each pixel in the image is also produced.

For example, the salient region detecting technology can be used to detect a main subject from the image.

A learning-based algorithm is used as an algorithm to detect the salient region. For example, in Japanese Unexamined Patent Publication No. 2001-236508, a type of a feature is previously learned and decided based on data of a plurality of images used as a learning target, and the feature of each portion in a target image data is extracted based on the decided type of feature and the target image data used as a calculation target of a saliency measure. According to the technology of Japanese Unexamined Patent Publication No. 2001-236508, a saliency measure closer to human sense can be determined by considering learning effect as a form of human experience or memory.

However, in the above learning-based algorithm, it is necessary to previously prepare a plurality of pieces of image data to obtain the learning target that can be previous knowledge for the target image data. Therefore, the saliency measure cannot be evaluated in the case where previous knowledge does not exist.

On the other hand, Japanese Unexamined Patent Publication No. 2010-258914 discloses a technology in which a salient region is detected using information between frames of a video image with no need for previous knowledge.

SUMMARY

In accordance with an aspect of an example embodiment of the present disclosure, there is provided an image processing device comprising: an image acquisition unit configured to acquire an image; a similarity map generator configured to calculate, with a region constructed with one or a plurality of pixels in the image as a constituent unit, a first similarity map based on a first algorithm, the first similarity map representing a degree of similarity between the region and a marginal region of the image, and calculate a second similarity map based on a second algorithm, the second similarity map representing a degree of similarity between the region and the marginal region of the image; and a saliency map generator configured to integrate the first similarity map and the second similarity map to generate a saliency map.

In accordance with another aspect of an example embodiment of the present disclosure, there is provided an image processing method performed by a computer, the image processing method comprising the steps of: acquiring an image; calculating, with a region constructed with one or a plurality of pixels in the image as a constituent unit, a first similarity map based on a first algorithm, the first similarity map representing a degree of similarity between the region and a marginal region of the image, and calculating a second similarity map based on a second algorithm, the second similarity map representing a degree of similarity between the region and the marginal region of the image; and integrating the first similarity map and the second similarity map to generate a saliency map.

In accordance with yet another aspect of an example embodiment of the present disclosure, there is provided a non-transitory computer readable medium having stored thereon a program causing a computer to execute each step of the image processing method.

BRIEF DESCRIPTION OF THE DRAWINGS

FIGS. 3A to 3C (collectively referred as FIG. 3) are views illustrating an example of a superpixel image;

FIGS. 4A to 4C (collectively referred as FIG. 4) are views illustrating an example of a recovery error map;

FIGS. 8A to 8G (collectively referred as FIG. 8) are views illustrating an example of a recovery error map correction processing with consideration of an object position;

DETAILED DESCRIPTION

An algorithm that detects a salient region of a region having a relatively high saliency measure in an image is derived based on various hypotheses.

For example, a conventional algorithm is derived based on a hypothesis that a salient region has a high contrast in a local region including the salient region or a hypothesis that a saliency measure increases toward a central portion of the image.

However, in the algorithm based on the former hypothesis, there is a problem in that the local region is hard to identify. The latter hypothesis does not hold true for all the images.

Therefore, the inventors develop the present invention by focusing on a new hypothesis, not used conventionally, in which, generally, a background region exists in an end portion (marginal portion) of the image.

(Configuration)

A configuration of an image processing device 1 according to an embodiment of the present invention will be described below.

Figure 1:
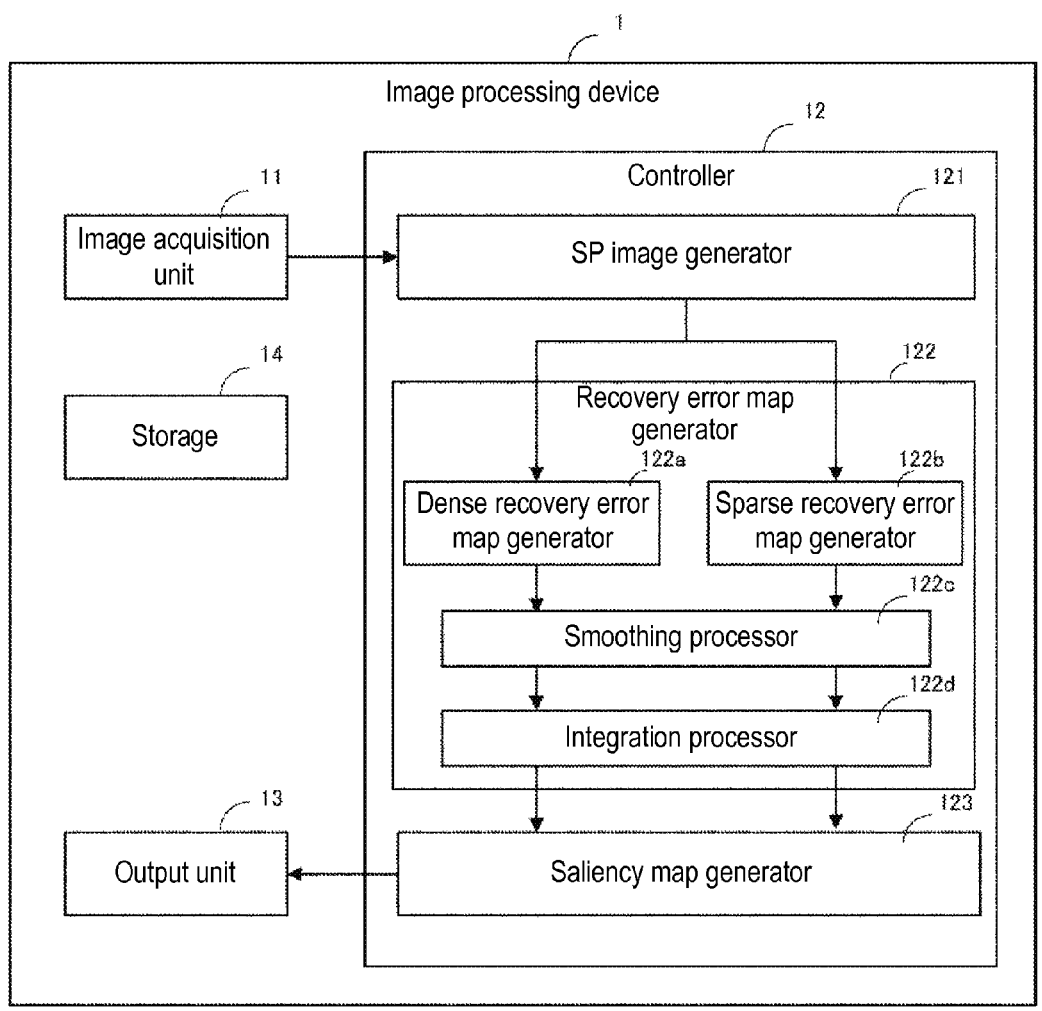
FIG. 1 is a view illustrating a functional block of an image processing device according to an embodiment.

FIG. 1 is a functional block diagram illustrating the configuration of the image processing device 1. The image processing device 1 in FIG. 1 acquires an input image, and outputs a saliency map indicating a saliency measure for each pixel of the acquired input image. In the embodiment, it is assumed that the input image is a still image. Alternatively, a moving image may be inputted to output the saliency map.

As illustrated in FIG. 1, the image processing device 1 includes an image acquisition unit 11, a controller 12, an output unit 13, and a storage 14.

The image acquisition unit 11 acquires the input image from an external source. For example, in response to an input manipulation of a user, the image acquisition unit 11 acquires the input image in a real-time (synchronous) or asynchronous manner from imaging devices, such as a digital camera and a digital video camera, which are connected to the image processing device 1.

However, there is no limitation to the input image acquiring method. For example, the image acquisition unit 11 may acquire image data stored in the storage 14 as the input image, acquire the input image from peripherals connected to the image processing device 1, and acquire the input image through a wired or wireless communication network.

The controller 12 totally controls various functions of the image processing device 1. Processing devices such as a CPU (Central Processing Unit) execute a control program to implement a control function of the controller 12.

Alternatively, the control function may be implemented by an ASIC (Application Specific Integrated Circuit) and the like. Alternatively, the control function may be implemented by a combination thereof.

In one of the control functions of the controller 12, the controller 12 has a function, and a configuration for performing various processing to the input image inputted from the image acquisition unit 11. The details of the function and the configuration of the controller 12 are described later.

The output unit 13 outputs an input image processing result of the controller 12 to an external source. For example, the output unit 13 may output the processing result to various image applications. The output unit 13 of the embodiment outputs the saliency map generated by the controller 12 with respect to the input image acquired by the image acquisition unit 11.

Various data and a computer program are stored in the storage 14. For example, the storage 14 can comprise a combination of storage devices such as a ROM (Read Only Memory), a RAM (Random Access Memory), and a nonvolatile memory (for example, a flash memory).

For example, the computer program executed by the controller 12 and various data processed by the computer program are stored in the storage 14.

(Controller)

Each unit of the controller 12 will be described below. As illustrated in FIG. 1, the controller 12 includes an SP image generator 121, a recovery error map generator 122, and a saliency map generator 123.

Figure 2:
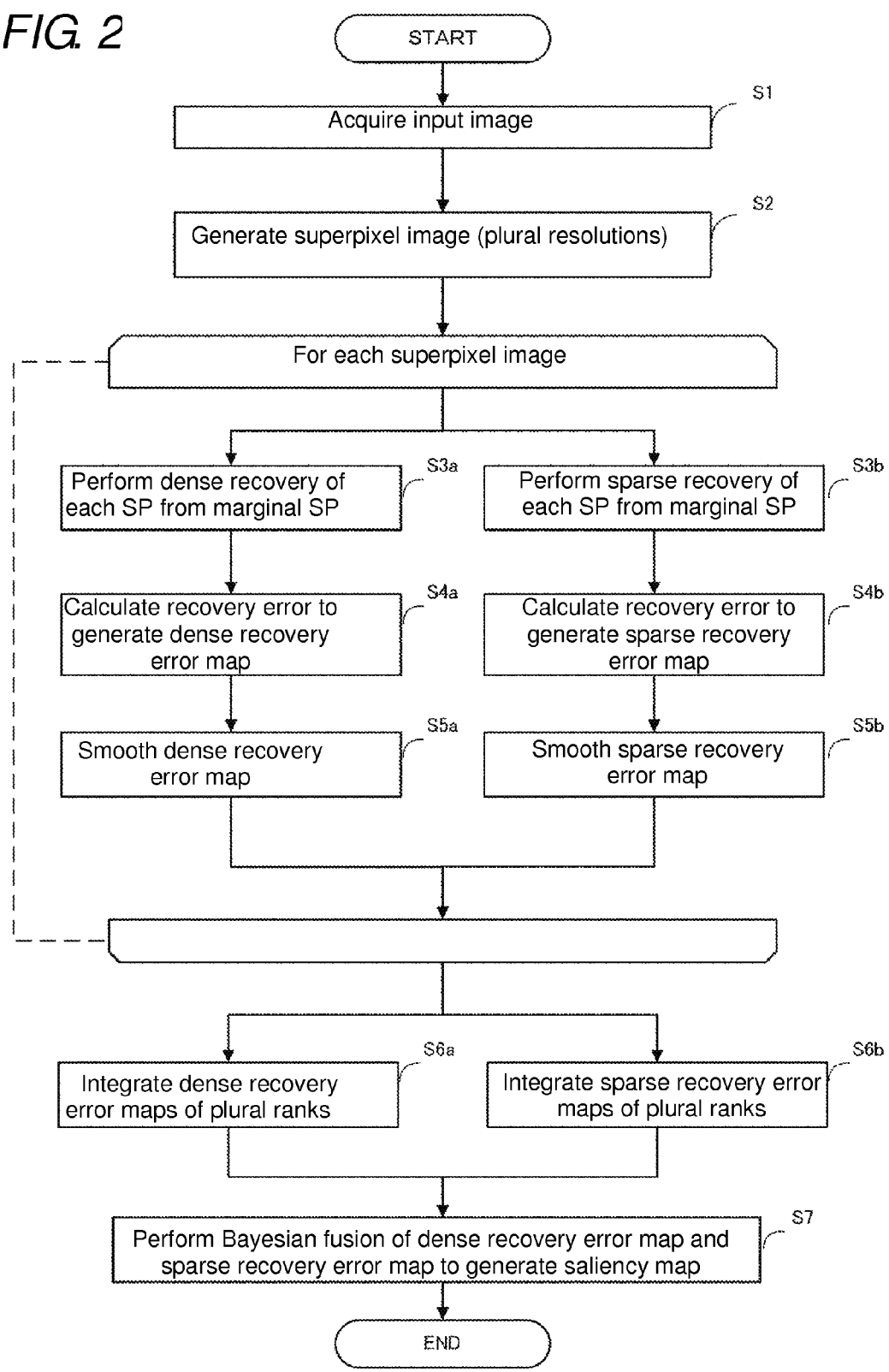
FIG. 2 is a flowchart illustrating a flow of an image processing method (saliency map generating method) of the embodiment.

A configuration of each functional unit will be described with reference to a flowchart in FIG. 2 illustrating a flow of image processing (saliency map generating processing) of the controller 12 together with other drawings.

<SP Image>

The controller 12 acquires the input image inputted to the image acquisition unit 11 (Step S1). The input image is delivered to the SP image generator 121. With the input image acquired from the image acquisition unit 11 as an original image, the SP image generator 121 generates a superpixel image (SP image) having a superpixel (SP) as a constituent unit from the original image having a pixel as a constituent unit. As described herein, a superpixel means a small region constructed with a plurality of adjacent pixels in which values of various parameters, such as color and luminance, are similar to each other in the image. Hence, a superpixel image can be said to be an image divided into a plurality of regions that are coupled to each other based on a feature quantity of a pixel of an input image. An image having a superpixel as a constituent unit is referred to as a superpixel image in order to distinguish the superpixel image from the original image.

Because amount of data processing can be largely reduced by performing image processing using the superpixel image instead of the original image, speed enhancement of the processing and memory saving in the processing can be achieved, and noises of various parameters (such as the luminance and the color) can also be constrained.

A plurality of generating algorithms for superpixel image generating is well known. For example, a well-known method described in http://www2.cs.sfu.ca/~mori/research/superpixels/ may be used.

A parameter controlling the number of generated superpixels exists in any superpixel image generating algorithm. A plurality of superpixel images having different superpixel numbers can be generated from one input image by adjusting the parameter. Hereinafter, the plurality of superpixel images having different superpixel numbers are referred to as the plurality of superpixel images having different resolutions.

As illustrated in FIG. 3, the SP image generator 121 generates a plurality of superpixel images 32-1, ..., 32-Ns (FIG. 3B) having different resolutions from one input image 31 (FIG. 3A). The number of generated superpixel images Ns may be arbitrary. For example, several to several tens of superpixel images can be generated.

Hereinafter, the image processing is performed with a superpixel as the constituent unit, and an average color feature and a pixel coordinate in Lab and RGB color spaces are used as the feature quantity in the superpixel. The feature quantity of each superpixel is expressed as follows.

$$x = \{L, a, b, R, G, B, x, y\} \qquad \text{[Mathematical formula 1]}$$

The saliency map can be more accurately calculated using both the Lab color feature and the RGB color feature.

The whole superpixel image can be expressed as follows.

$$X = [x_1, x_2, \ldots x_N] \in R^{D \times N} \qquad \text{[Mathematical formula 2]}$$

Where $x_i$ is the feature quantity in each superpixel, N is the number of superpixels, and D is a dimensional number of the feature quantity.

<Marginal Region>

In the superpixel image of each resolution, the superpixel including the end portions (upper, lower, right, and left ends) of the image is referred to as marginal superpixel (marginal region). An image constructed with the marginal superpixel is referred to as a marginal image. FIG. 3C illustrates an example of a marginal image.

<Recovery Error Map Generator>

With a marginal region as a template set, the recovery error map generator 122 recovers (reconfigures) other regions to generate a recovery error map representing a recovery error. Because the marginal portion is a background in many images, it is considered that, in the recovery, the recovery error is small in a background region while the recovery error is large in a foreground region. That is, the recovery error can be said to be a scale representing to what degree the target pixel is similar to the marginal region, and the recovery error map can be understood as a similarity map representing a degree of similarity to the marginal region.

As illustrated in FIG. 1, the recovery error map generator 122 includes a dense recovery error map generator 122a, a sparse recovery error map generator 122b, a smoothing processor 122c, and an integration processor 122d.

The dense recovery error map generator 122a and the sparse recovery error map generator 122b generate the recovery error maps using different algorithms, respectively (Steps S3a to S4a and S3b to S4b in FIG. 2). The recovery error maps are generated with respect to the superpixel images having the different resolutions, respectively. The smoothing processor 122c performs smoothing processing on each recovery error map (Steps S5a and S5b). The integration processor 122d integrates a plurality of dense recovery error maps (also referred to as dense recovery error maps with a plurality of ranks) generated from the superpixel images having the different resolutions to generate one dense recovery error map in units of pixels (Step S6a), and a plurality of sparse recovery error maps (also referred to as sparse recovery error maps with a plurality of ranks) generated from the superpixel images having the different resolutions to generate one sparse recovery error map in units of pixels (Step S6b).

Each sub-functional unit in the recovery error map generator 122 will be described below in detail.

<<Dense Recovery Error Map Generator 122a>>

The dense recovery error map generator 122a calculates an error (also referred to as a recovery error or a reconfiguration error) in the case where a target region is reconfigured from a marginal region using a Principal Component Analysis (PCA). Hereinafter, the recovery (reconfiguration) performed by the dense recovery error map generator 122a using the PCA is referred to as dense recovery.

As illustrated in Step S3a, each superpixel in the superpixel image is subjected to the dense recovery in which the marginal superpixel is used. The dense recovery will be described below in detail.

A principal component analysis is performed on a background template constructed with (M) feature quantities $b_1, b_2, \ldots, b_M$ of the marginal superpixels to calculate a normalized covariance matrix $U_B$ constructed with D' eigenvectors (principal component vectors) $u_1, u_2, \ldots, u_{D'}$.

$$U_B = [u_1, u_2, \ldots, u_{D'}] \quad \text{[Mathematical formula 3]}$$

Where a value of D' may be arbitrary under the condition of 1≤D'<M, and the value of D' may be previously decided, or decided based on a contribution ratio (a ratio of a sum of variances up to a D'-th principal component to a summation of the variances).

Using the PCA basis $U_B$, a recovery factor $\beta_i$ of each superpixel is calculated as follows. Each superpixel can be recovered by the marginal superpixel using the recovery factor $\beta_i$.

$$\beta_i = U_B^T (x_i - \bar{x}) \quad \text{[Mathematical formula 4]}$$

Where an x-bar (symbol in which a bar is added to the top of x) is an average feature quantity of feature quantities X of the whole superpixel image.

The dense recovery can be said to be a technique for reconfiguring the feature quantities in a target region through a linear combination of eigenvectors using a plurality of eigenvector (principal component vectors) obtained by performing the principal component analysis. The recovery factor $\beta_i$ is a factor that is used in the linear combination of the eigenvectors.

Then, in Step S4a, the recovery error (reconfiguration error) $\epsilon_i^d$ of the dense recovery is calculated as follows.

$$\epsilon_i^d = \|x_i - (U_B \beta_i + \bar{x})\|_2^2 \quad \text{[Mathematical formula 5]}$$

Thus, the dense recovery error map can be generated with respect to one superpixel image.

FIG. 4 illustrates an example of the dense recovery error map obtained by the dense recovery error map generator 122a. FIG. 4A illustrates two kinds of input images, and FIG. 4B illustrates the dense recovery error map obtained from each input image in FIG. 4A. In FIG. 4, the whiter a region is the larger the recovery error will be that is the degree of similarity to the marginal portion will be small.

In the dense recovery, because the reconfiguration is performed based on the principal component of the marginal region, the recovery error increases in the region different from the marginal portion. Accordingly, recovery error increases in the foreground portion. On the other hand, the dense recovery is susceptible to noise, and sometimes a large recovery error is calculated even in the background portion.

<<Sparse Recovery Error Map Generator 122b>>

The sparse recovery error map generator 122b calculates an error in a case where the target region is reconfigured from the marginal region using sparse coding. Hereinafter, the recovery (reconfiguration) performed by the sparse recovery error map generator 122b using the sparse coding is referred to as sparse recovery.

As illustrated in Step S3b, each superpixel in the superpixel image is subjected to the sparse recovery in which the marginal superpixel is used. The sparse recovery will be described below in detail.

Each superpixel is coded like the following equation using a background template $B = [b_1, b_2, \ldots, b_M]$ constructed with M feature quantities of marginal superpixels.

$$\alpha_i = \underset{\alpha}{\operatorname{argmin}} \|x_i - B\alpha_i\|_2^2 + \lambda \|\alpha_i\|_1 \quad \text{[Mathematical formula 6]}$$

That is, a recovery factor $\alpha_i$ is decided based on minimum cost function. A target region can be approximated by a linear combination of marginal feature quantity vectors using the recovery factor $\alpha_i$. In sparse coding, the recovery factor $\alpha_i$ is decided in a manner such that as many elements of the recovery factor (vector) $\alpha_i$ as possible become zero. That is, the feature quantity vector in the target region is reconfigured by the linear combination of the smallest possible number of feature quantity vectors in the feature quantity vectors constituting the background template B.

Then, in Step S4b, the recovery error (reconfiguration error) $\epsilon_i^s$ of the sparse recovery is calculated as follows.

$$\epsilon_i^s = \|x_i - B\alpha i\|_2^2 \quad \text{[Mathematical formula 7]}$$

Thus, the sparse recovery error map can be generated with respect to one superpixel image.

FIG. 4 illustrates an example of the sparse recovery error map obtained by the sparse recovery error map generator 122b. FIG. 4A illustrates two kinds of input images, and FIG. 4C illustrates the sparse recovery error map obtained from each input image in FIG. 4A. In the drawing, the whiter a region is, the larger the recovery error will be that is the degree of similarity to the marginal portion will be small.

In the sparse recovery, because all the feature quantity vectors in the marginal region are used as basis, the recovery error decreases and a background region in a region similar to the marginal portion can be reliably detected.

On the other hand, in right hand examples in FIG. 4 in which a salient object exists in a marginal portion, the recovery error is calculated to be small in a part (a body and an arm of a person) of the salient object.

The sparse recovery error has robustness against the complicated background, and the dense recovery error has high accuracy in the case where a salient object also exists in a marginal portion of the image. Accordingly, the dense recovery error and the sparse recovery error complement each other in the calculation of a saliency measure.

<<Smoothing Processor 122c>>

In consideration of a feature of a local region, the smoothing processor 122c performs smoothing processing on each recovery error map (the dense recovery error map and the sparse recovery error map) generated from one superpixel image (Steps S5a and S5b in FIG. 2). Contents of the smoothing processing are independent of a target recovery error map, namely, the dense recovery error map and the sparse recovery error map. Therefore, the dense recovery error map and the sparse recovery error map are not distinguished from each other, but collectively described as the recovery error map as follows.

Figure 5:
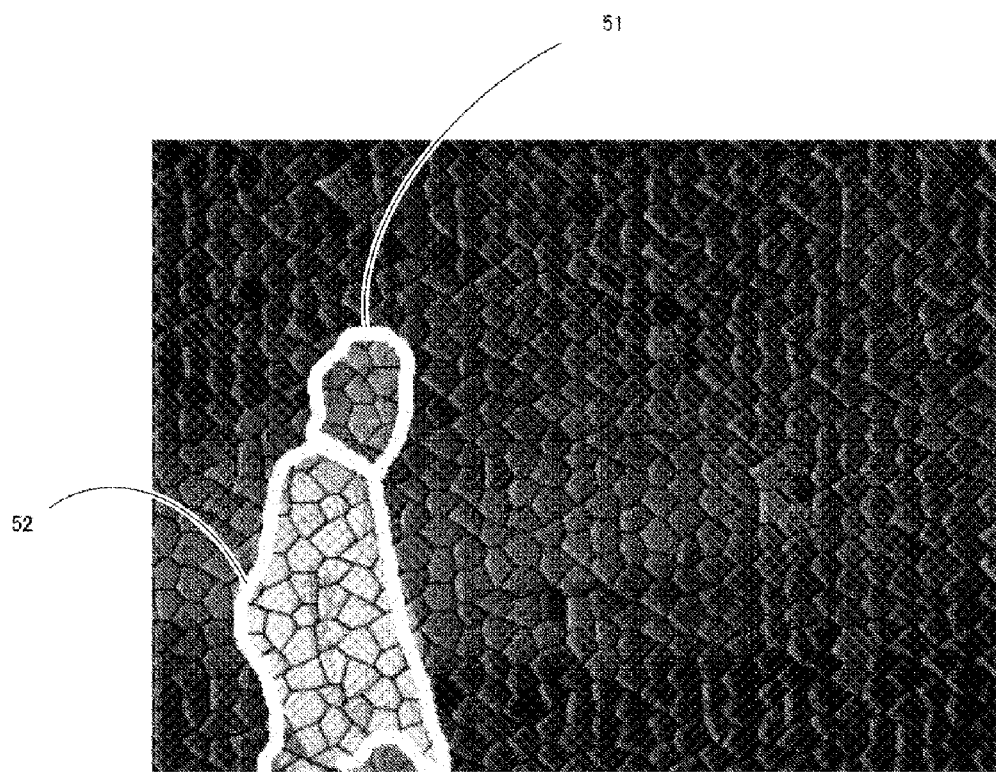
FIG. 5 is a view illustrating clustering in recovery error map smoothing processing.
Figure 6A:
FIGS. 6A to 6E (collectively referred as FIG. 6) are views illustrating an example of the recovery error map smoothing processing.
Figure 6B:
Figure 6C:
Figure 6D:
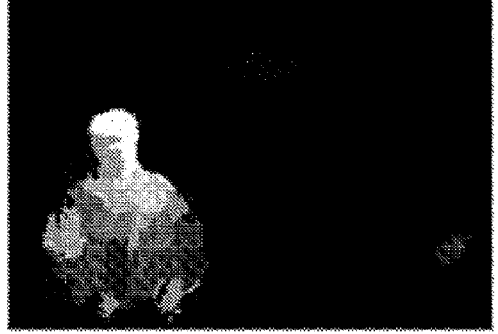
Figure 6E:
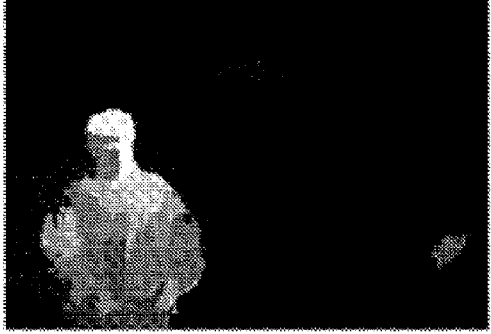

The smoothing processor 122c firstly performs clustering (grouping) processing to the superpixel image, which is the basis for the generation of the recovery error map. Any existing image clustering algorithm can be used, and K-means clustering is adopted in the embodiment. FIG. 5 illustrates a processing example of the clustering. Although only two clusters 51 and 52 are illustrated in FIG. 5, the whole image is actually divided into more clusters.

The smoothing processing is performed such that the recovery error diffuses in each cluster. With regard to error diffusion, the diffusion (smoothing) is performed in consideration of an image feature quantity in each cluster that is in consideration of a context of an image. More particularly, the following processing is performed.

A post-diffusion error (diffusion error) of each superpixel is initialized by the recovery error of each superpixel.

$$\tilde{\epsilon}_i = \epsilon_i$$ [Mathematical formula 8]

The left-hand side of Mathematical formula (8) is diffusion error, and the right-hand side is the dense recovery error or the sparse recovery error. It is assumed that labels 1, 2, 3, . . . (index i) are allocated to the superpixels in a cluster in a descending order of the recovery error.

The diffusion error is calculated as follows.

$$\tilde{\epsilon}_i = \tau \sum_{j=1}^{Nc} w_{ik_j} \tilde{\epsilon}_{k_j} + (1-\tau)\epsilon_i$$ [Mathematical formula 9]

$$w_{ik_j} = \frac{\exp\left(-\frac{\|x_i - x_{k_j}\|^2}{2\sigma_x^2}\right)(1-\delta(k_j-i))}{\sum_{j=1}^{Nc} \exp\left(-\frac{\|x_i - x_{k_j}\|^2}{2\sigma_x^2}\right)}$$ [Mathematical formula 10]

Where Nc is the number of superpixels in the cluster, and $\{k_1, k_2, \ldots, k_{Nc}\}$ indicates the label of the superpixel in the cluster. $\tau$ is a weighting parameter satisfying $0<\tau<1$. $\sigma_x^2$ is a sum of variances in the dimensions of the feature quantity X, and $\delta$ is a delta function.

A first term on the right-hand side of Mathematical formula (9) can be said to be a weighted average of reconfiguration errors of other superpixels in the same cluster. The weight is $w_{ikj}$ of Mathematical formula (10). A second term on the right-hand side is an initial value of the reconfiguration error of the target superpixel. Accordingly, as a whole, Mathematical formula (9) can be said to be processing to calculate a weighted average of the weighted average of the reconfiguration errors of other superpixels and the initial value of the reconfiguration error of the target superpixel using the weighting parameter T.

Thus, the diffusion errors of the superpixels are calculated in a descending order of the reconfiguration error in each cluster. Similarly, the processing is performed to all the clusters. Through the smoothing processing, the accuracy of the recovery error can be improved due to consideration of the features (the color feature and the luminance feature) of the original image.

FIG. 6 illustrates an example of a processing result of the smoothing processing. FIG. 6A illustrates an input original image, FIG. 6B illustrates a pre-smoothing-processing dense recovery error map, FIG. 6C illustrates a post-smoothing-processing dense recovery error map, FIG. 6D illustrates a pre-smoothing-processing sparse recovery error map, and FIG. 6E illustrates a post-smoothing-processing sparse recovery error map. Because a part (body) of the salient object (person) exists in a marginal portion, a part of a salient region is detected as a background region in both dense and sparse recovery error maps before smoothing processing (the calculated recovery error is small). On the other hand, after smoothing processing is performed, a color feature of the original image is considered to enable more accurate recognition of the salient region, and the recovery error (saliency measure) is more uniform in the salient region.

<<Integration Processor 122d>>

The integration processor 122d integrates dense and sparse recovery error maps with a superpixel as constituent unit that are generated from a plurality of superpixel images to generate dense and sparse recovery error maps with a pixel as constituent unit, respectively (Steps S6a and S6b in FIG. 2). The recovery error map is corrected (improved) by performing weighting in consideration of an object position. Contents of the integration processing are independent of a target recovery error map, namely, the dense recovery error map and the sparse recovery error map. Therefore, the dense recovery error map and the sparse recovery error map are not distinguished from each other, but collectively described as the recovery error map. A recovery error map with superpixel as constituent unit (superpixel-unit recovery error map) inputted to the integration processor 122d is referred to as an "SP recovery error map" as follows, and the "recovery error map" would be referred to as a recovery error map with a pixel as a constituent unit (pixel-unit recovery error map) that is generated by the integration processor 122d.

Integration Processing of Recovery Error Maps with a Plurality of Ranks

The integration processor 122d calculates a weighted average of a plurality of SP recovery error maps to generate the recovery error map. The weighting increases as a feature quantity of a target pixel in the input original image is closer to a feature quantity of a superpixel to which the target pixel belongs in the superpixel image. Specifically, the recovery error of each pixel is calculated through the following operation to integrate the plurality of SP recovery error maps.

$$E(z) = \frac{\sum_{s=1}^{Ns} \omega_{zn(s)} \tilde{\varepsilon}_{n(s)}}{\sum_{s=1}^{Ns} \omega_{zn(s)}},$$ [Mathematical formula 11]

$$\omega_{zn(s)} = \frac{1}{\|f_z - x_{n(s)}\|_2}$$

Where z is a pixel position, n(s) is a label of a superpixel including a pixel z in an s-th (s-th rank) superpixel image, the symbol with a wave added to the top of $\varepsilon_{n(s)}$ is a recovery error in the superpixel n(s), $x_{n(s)}$ is a feature quantity in the superpixel n(s), and $f_z$ is a feature quantity in the pixel z of the input image.

Figure 7A:
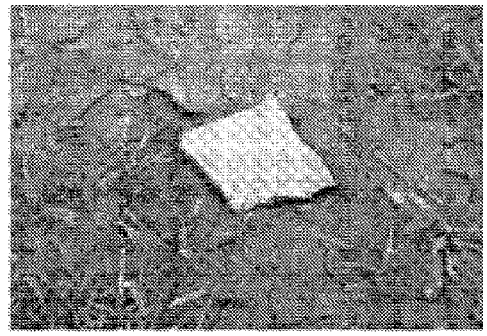
FIGS. 7A to 7E (collectively referred as FIG. 7) are views illustrating an example of integration processing to integrate a plurality of recovery error maps.
Figure 7B:
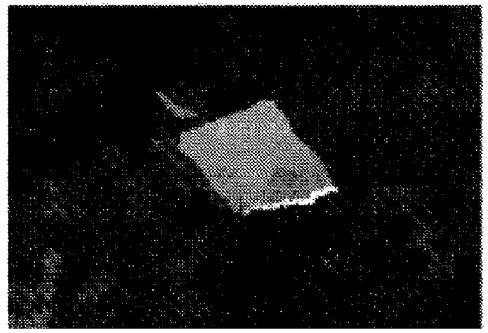
Figure 7C:
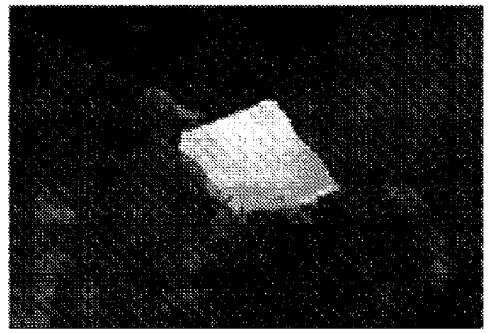
Figure 7D:
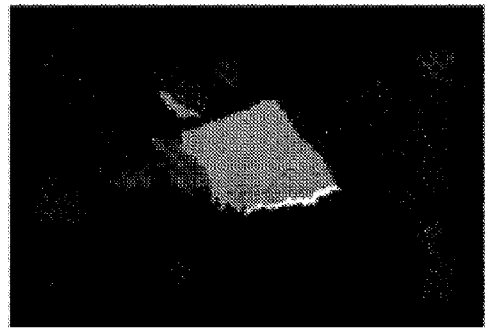
Figure 7E:
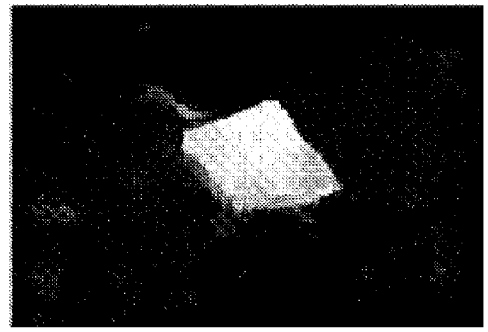

Thus, when a degree of similarity of the feature quantity of the superpixel corresponding to the pixel z is used as a weighting parameter, the SP recovery error maps generated from the superpixel images having a plurality of resolutions are integrated to enable generation of an accurate recovery error map. FIG. 7 illustrates an example of an integration processing result of the integration processor 122d. FIG. 7A illustrates an original image, FIGS. 7B and 7D illustrate the recovery error map obtained by calculating a simple average of the plurality of SP recovery error maps, and FIGS. 7C and 7E illustrate recovery error maps obtained from a plurality of recovery error map by performing the integration of the present technique. FIGS. 7B and 7C illustrate dense recovery error maps and FIGS. 7D and 7D illustrate sparse recovery error maps. As can be seen from FIG. 7, in all the recovery error maps, the salient region can be more correctly detected by performing the integration of the present technique.

Correction of Recovery Error Map in Consideration of Object Position

Weighting is performed to an integration result in consideration of an object position to correct (improve) recovery error. Conventionally, assuming that a salient object is located in a center of an image, the correction is performed as the weight increases toward the center of the image. In the present technique, the weight increases toward the center of the object.

Specifically, the following Gaussian filter is applied to an integrated recovery error map.

$$G(z) = \exp\left[-\left(\frac{(x_z - x_0)^2}{2\sigma_x^2} + \frac{(y_z - y_0)^2}{2\sigma_y^2}\right)\right]$$ [Mathematical formula 12]

$$x_0 = \sum_i \frac{E(i)}{\sum_j E(j)} x_i, \ y_0 = \sum_i \frac{E(i)}{\sum_j E(j)} y_i$$

That is, a barycenter of the recovery error map is regarded as the position of a salient object, and the Gaussian filter is generated around the barycenter of the recovery error map. For example, ¼ of width and ¼ of height of an image can be used as parameters $\sigma_x$ and $\sigma_y$ for deciding a filter shape.

A final recovery error map $S(z) = E(z) \times G(z)$ is obtained by multiplying an integrated recovery error map E(z) by a Gaussian filter G(z). FIG. 8 illustrates a correction effect of the present technique. FIG. 8A illustrates an input original image, FIGS. 8B and 8C illustrate pre-correction dense and sparse recovery error maps, FIGS. 8D and 8E illustrate object bias Gaussian filters G(z) calculated from the dense and sparse recovery error maps, and FIGS. 8F and 8G illustrate post-correction dense and sparse recovery error maps. In the post-correction recovery error map, the center of the salient object can be more correctly expressed, which help in the generation of an accurate saliency map.

<Saliency Map Generator>

The saliency map generator 123 generates a saliency map by performing fusion of the dense and sparse recovery error maps generated by the recovery error map generator 122. In the present technique, the fusion of the recovery error maps is performed by a Bayesian estimation. Because the dense and sparse recovery error maps complement each other as described above, accurate saliency map is obtained by the fusion of the dense and sparse recovery error maps.

Figure 9:
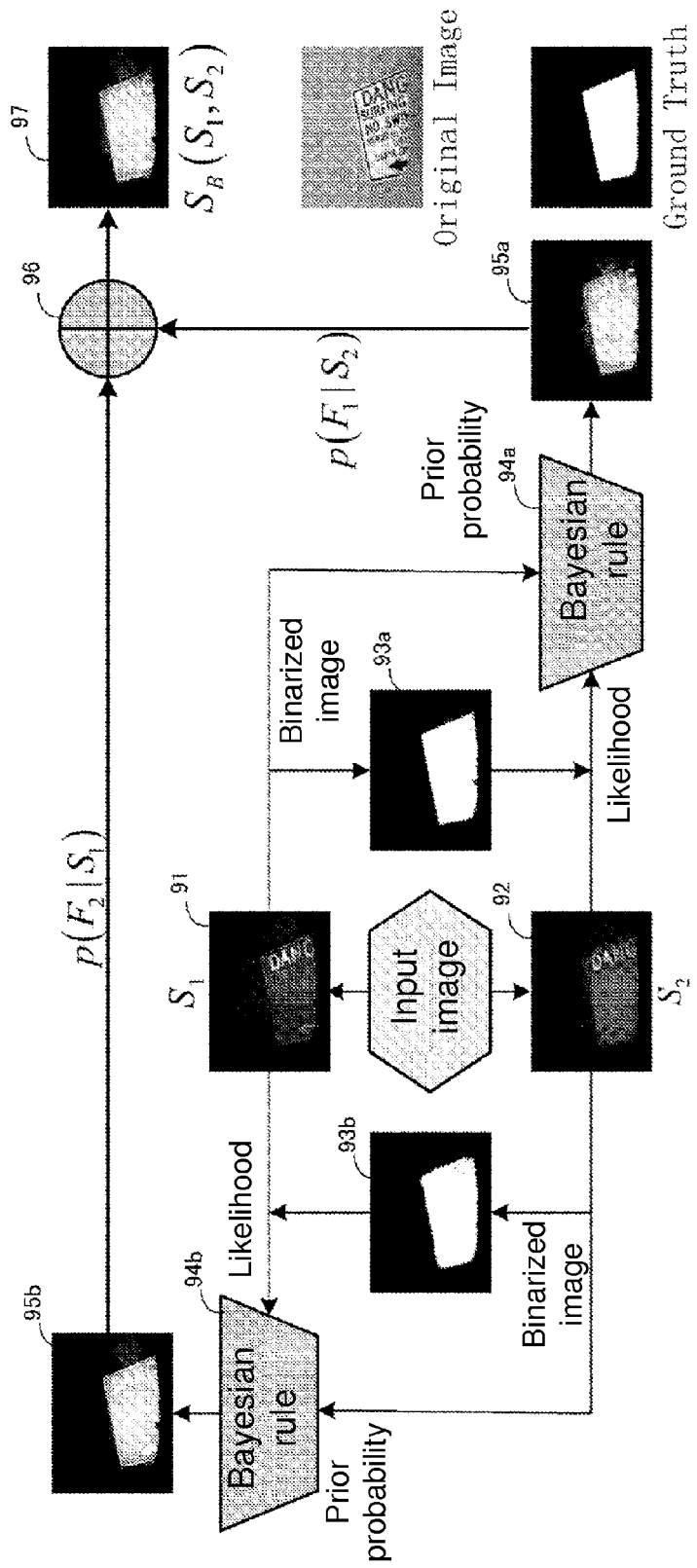
FIG. 9 is a view illustrating fusion processing of two recovery error maps based on Bayesian estimation.

A method for performing the fusion of the two recovery error maps will be described in detail with reference to FIG. 9. Hereinafter, a dense recovery error map (91) is referred to as $S_1$ and a sparse recovery error map (92) is referred to as $S_2$. As illustrated in the drawing, two saliency maps (95a and 95b) are generated with $S_1$ and $S_2$ as prior probabilities, and a final saliency map (97) is obtained by synthesizing the two saliency maps (95a and 95b). Hereinafter, the recovery error map used as the prior probability is expressed by $S_i$ (i={1,2}), and the other recovery error map is expressed by $S_j$ (j≠i, j={1,2}).

Binarized images (93a and 93b) are obtained with respect to Si with an average value of the recovery errors as a threshold. Through the binarization, the whole image is divided into a foreground $F_i$ (the recovery error is greater than or equal to the threshold) and a background $B_i$ (the recovery error is less than the threshold). For each of the foreground $F_i$ and the background $B_i$, $S_i$ and $S_j$ are compared to each other using the following equation, the number of pixels in which the pixel z of $S_i$ exists in the foreground or background region in the other recovery error map $S_j$ is obtained, and a foreground likelihood and a background likelihood are calculated based on the number of pixels.

$$p(S_j(z) \mid F_i) = \frac{N_{bF_i}(S_j(z))}{N_{F_i}},$$ [Mathematical formula 13]

$$p(S_j(z) \mid B_i) = \frac{N_{bB_i}(S_j(z))}{N_{B_i}}$$

Where $N_{Fi}$ and $N_{Bi}$ are the numbers of pixels of the foreground and background in $S_i$, and $N_{bFi}(S_j(z))$ and $N_{bBi}(S_j(z))$ are the numbers of pixels in which the pixel z exists in the foreground and background of the other recovery error map $S_j$.

Then fusion (94a and 94b) is performed by a Bayesian rule using the recovery error map $S_i$, the foreground likelihood, and the background likelihood that are obtained as described above.

$$p(F_i \mid S_j(z)) = \frac{S_i(z)p(S_j(z) \mid F_i)}{S_i(z)p(S_j(z) \mid F_i) + (1 - S_i(z))p(S_j(z) \mid B_i)}$$ [Mathematical formula 14]

Therefore posterior probability maps (95a and 95b) are obtained.

The two posterior probabilities are integrated as follows (96), and final saliency map $S_B$ ($S_1$ and $S_2$) (97) is obtained.

$$S_B(S_1(z), S_2(z)) = p(F_1 \mid S_2(z)) + p(F_2 \mid S_1(z))$$ [Mathematical formula 15]

Various pieces of information can be integrated using the dense and sparse recovery error maps. A substantially uniform saliency map can be obtained with the dense and sparse recovery error maps as the prior probabilities.

(Experimental Result)

Figure 10:
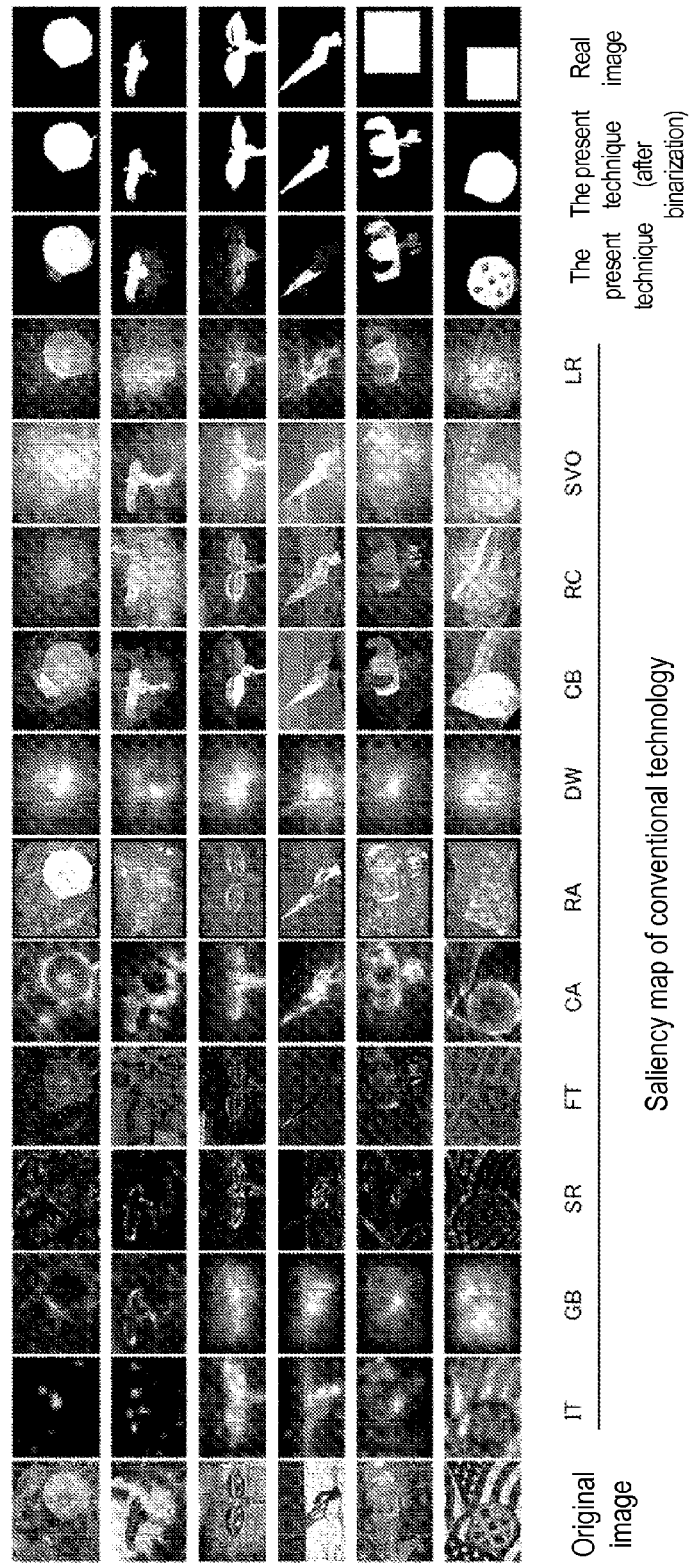
FIG. 10 is a view illustrating a comparison of a saliency map generated by the present technique and a saliency map generated by a conventional technique.

The saliency maps obtained by the present technique and a conventional technique will be described below. FIG. 10 illustrates an input original image, a saliency map obtained by a conventional technology, a saliency map obtained by the present technique, and a binarized saliency map obtained by the present technique, and a real image.

The following parameters are used in the application of the present technique.

SP image: eight SP images having a number of superpixels of 50 to 400 are generated. The number of clusters of K-means clustering K:8. Weight in smoothing (error diffusion) processing τ:0.5. The number of principal component vectors D' of PCA D' is decided such that a contribution ratio satisfies 95%. Parameter λ in cost function of sparse coding: 0.01

In the present technique, compared with the conventional technology, the salient region can be more accurately detected. Another advantageous effect of the present technique is a uniform detection result.

Conventional techniques illustrated in FIG. 10 refer to algorithms described in the following literature.

[IT] L. Itti, C. Koch, and E. Niebur. A model of saliency-based visual attention for rapid scene analysis. PAMI, 20:1254-1259, 1998.
[GB] J. Harel, C. Koch, and P. Perona. Graph-based visual saliency. In NIPS, 2006.
[SR] X. Hou and L. Zhang. Saliency detection: A spectral residual approach. In CVPR, 2007.
[FT] R. Achanta, S. Hemami, F. Estrada, and S. Susstrunk. Frequency-tuned salient region detection. In CVPR, pages 1597-1604, 2009.
[CA] S. Goferman, L. Zelnik-Manor, and A. Tal. Context-aware saliency detection. In CVPR, pages 2376-2383, 2010.
[RA] E. Rahtu, J. Kannala, M. Salo, and J. Heikkilae. Segmenting salient objects from images and videos. In ECCV, pages 366-379, 2010.
[DW] L. Duan, C. Wu, J. Miao, L. Qing, and Y. Fu. Visual saliency detection by spatially weighted dissimilarity. In CVPR, pages 473-480, 2011.
[CB] H. Jiang, J. Wang, Z. Yuan, T. Liu, N. Zheng, and S. Li. Automatic salient object segmentation based on context and shape prior. In BMVC, 2011.
[RC] M.-M. Cheng, G.-X. Zhang, N. J. Mitra, X. Huang, and S.-M. Hu. Global contrast based salient region detection. In CVPR, pages 409-416, 2011.
[SVO] K.-Y. Chang, T.-L. Liu, H.-T. Chen, and S.-H. Lai. Fusing generic objectness and visual saliency for salient object detection. In ICCV, pages 914-921, 2011.
[LR] X. Shen and Y. Wu. A unified approach to salient object detection via low rank matrix recovery. In CVPR, pages 853-860, 2012.

MODIFICATIONS

The embodiment of the present invention is described only by way of an example, but the scope of the present invention is not limited to the embodiment.

For example, the similarity map (recovery error map) may be generated by any algorithm as long as the algorithm can express a degree of similarity to a marginal region. As described above, the recovery errors (the degrees of similarity) based on the dense recovery and the sparse recovery are algorithms having different features and complement each other, and which allows a saliency map to be accurately generated. However, the similarity map generating algorithm of the present technique is not limited to the recovery errors based on the dense recovery and the sparse recovery. For example, the similarity map may be generated by manifold ranking. Also, in obtaining a degree of similarity to a whole marginal region, the degrees of similarity to the upper, lower, right, and left end portions may be obtained, and the degree of similarity to the marginal region may be obtained by integrating the degrees of similarity to the upper, lower, right, and left end portions.

In the above description, the similarity map is generated by two algorithms. Alternatively, the similarity map may be generated by at least three algorithms. In this case, in order to integrate the similarity maps to obtain the final saliency map, a posterior probability is obtained with each of any two combinations in all the similarity maps as the prior probability, and the posterior probabilities may be integrated. Assuming that N is a similarity map number, the posterior probabilities in N×(N−1) ways may be generated and integrated.

In the above description, the superpixel images having different resolutions are generated, and the similarity map is generated from each of the superpixel images having different resolutions. Alternatively, the similarity map may be generated from only one superpixel image. In this case, the processing to integrate the similarity maps generated from the superpixel images having the different resolutions may be eliminated (Steps S6a and S6b in FIG. 2). The similarity map aimed at the pixel-unit input image (with a pixel as a constituent unit) may be generated without generating the superpixel. Even in this case, the salient object can be detected.

The similarity map smoothing processing (Steps S5a and S5b in FIG. 2) can also be eliminated. Through the smoothing processing, a variation on the similarity map can be smoothed to enhance accuracy. However, the salient object can be detected even if the smoothing processing is eliminated.

In the above description, using the Bayesian estimation, the fusion of a plurality of similarity maps is performed to generate a final saliency map. However, the final saliency map may be generated from the plurality of similarity maps by another method. For example, the average (either the simple average or the weighted average) of each similarity map may be used as the final saliency map. Because the features of the similarity maps generated by the different algorithms can be considered even if another method is adopted, accuracy is improved compared with the case that the similarity map generated by only one algorithm is used as the saliency map.

Implementation Example

The specific implementation of the image processing device can be performed by both software (program) and hardware. For example, a computer program is stored in a memory of a computer (such as a microcomputer, a CPU, an MPU, and an FPGA) incorporated in the image processing device, and each processing may be performed by causing the computer to execute the computer program. A dedicated processor, such as an ASIC, in which a part or whole of the processing of an example embodiment of the present invention is performed by a logic circuit, is preferably provided. The example embodiment of the present invention can also be applied to a server in a cloud environment.

For example, an embodiment of the present invention is put into practice in the form of a method including steps performed by a system or device computer that implements the function of the embodiment by reading and executing the program recorded in a storage device. To this end, a program is provided to the computer from various types of recording media (computer readable recording media non-transiently or non-transitorily retaining data) that can become the storage device through a network. Therefore, a computer (including devices such as the CPU and the MPU), a method, a program (including a program code and a program product), and a computer-readable recording medium non-transiently or non-transitorily retaining the program are in the scope of the present invention.

Turning now to prior art, Japanese Unexamined Patent Publication No. 2010-258914, again, although previous knowledge is not required, the technology of Japanese Unexamined Patent Publication No. 2010-258914 is aimed only at a moving image constructed with plural frames, but cannot be applied to an evaluation of the saliency measure for a still image.

An object of an example of the present invention is thus to provide an image processing technology able to accurately evaluate a saliency measure even for one still image with no need for previous knowledge based on learning.

In order to achieve the above object, the saliency measure is calculated on an assumption that a background region (a region that is not a salient region) exists in a marginal portion of an image or that the salient region does not exist in the marginal portion of the image frequently.

Specifically, an image processing device according to one aspect of an example embodiment of the present invention includes: an image acquisition unit that acquires an image; a similarity map generator that calculates, with a region constructed with one or more pixels in the image as a constituent unit, a first similarity map based on a first algorithm, the first similarity map representing a degree of similarity between the region and a marginal region of the image, and calculates a second similarity map based on a second algorithm, the second similarity map representing a degree of similarity between the region and the marginal region of the image; and a saliency map generator that integrates the first similarity map and the second similarity map to generate a saliency map.

The marginal portion of the image means a region including an end portion (upper, lower, right, and left ends) of the image. A region having a high degree of similarity to the marginal region has a high possibility of being the background, and can be determined to have a low degree of saliency. On the other hand, a region having a low degree of similarity has a high possibility of being the foreground, and can be determined to have a high degree of saliency. At least two similarity maps are generated by different algorithms and integrated, which allows the saliency map to be more accurately generated compared with the case that the saliency map is generated based on one similarity map.

In the image processing device, preferably the similarity map generator reconfigures a target region based on the marginal region, and generates the first and second similarity maps with consideration that the degree of similarity increases with decreasing reconfiguration error. This is because the target region is said to have the high degree of similarity to the marginal region when the original region can be accurately recovered by an expression of the target region based on the marginal region.

In the example embodiment of the present invention, preferably the first algorithm differs from the second algorithm in features. For example, preferably adopting an algorithm that would surely determine that a salient region has a low degree of similarity even if there is a possibility that a degree of similarity except the salient region is determined to be low (the saliency measure is high) and an algorithm that would surely determine that the region except the salient region has a high degree of similarity even if there is a possibility that a degree of similarity in the salient region is determined to be high (the saliency measure is low).

For example, a method based on reconfiguration with a Principal Component Analysis (PCA) can be cited as the first algorithm. Preferably the first algorithm may calculate a plurality of eigenvectors by performing a principal component analysis on a feature quantity of the marginal region, reconfigure a feature quantity of the target region by a linear combination of the plurality of eigenvectors, and perform calculation such that the degree of similarity increases with decreasing reconfiguration error.

A method based on reconfiguration with sparse coding can be cited as the second algorithm. Preferably the second algorithm may, based on approximation of a feature quantity of a target region by using a combination of smallest possible number of feature quantities of marginal regions, reconfigure the feature quantity of the target region by a linear combination of the feature quantities of the marginal regions using a factor having a minimum cost function, and perform a calculation such that a degree of similarity increases with decreasing reconfiguration error.

In the image processing device, preferably superpixel processing is performed as pre-processing on the input image. Preferably the image processing device may further include a superpixel image generator configured to generate a superpixel image by dividing the image acquired by the image acquisition unit into regions, each of which is constructed with a plurality of pixels coupled to each other based on a feature quantity of a pixel. In this case, the similarity map generator generates the first and second similarity maps in units of superpixels based on the superpixel image generated by the superpixel image generator.

The adjacent regions where the feature quantities are similar to each other are dealt with as one pixel (superpixel) to obtain an effect of speed enhancement and memory saving because of reduction of data amount and an effect that constrains influence of noise.

In the superpixel processing, there is a parameter for adjusting size of the superpixel image that is how many superpixels the superpixel image is divided into. In the image processing device, the plurality of superpixel images having different superpixel numbers are generated, and the similarity map may be generated from the plurality of superpixel images. In the generation of the similarity map, the similarity map is generated from each of the plurality of superpixel images based on the first algorithm, and the plurality of similarity maps may be integrated to generate the first similarity map. Similarly, the similarity map is generated from each of the plurality of superpixel images based on the second algorithm, and the plurality of similarity maps may be integrated to generate the second similarity map.

The influence of noise can be constrained by integrating similarity maps after the similarity maps are generated from each of the plurality of superpixel images to more accurately generate the first or second similarity map.

In the image processing device, preferably smoothing processing is performed on the similarity map obtained from each of the plurality of superpixel images. With regard to the smoothing processing, preferably the superpixel image of the original image used to calculate the similarity map is clustered (grouped) and reconfiguration error is diffused in each cluster. In the case that a salient object exists in a marginal portion of an input image, the marginal portion is not always the background even if a degree of similarity to the marginal portion is high. The degree of similarity in another region in the cluster can be obtained by performing the smoothing processing in the cluster, so that the salient region can accurately be detected even if the salient object exists in the marginal portion.

In the image processing device, in the case where the first and second similarity maps are generated from the similarity maps generated from the plurality of superpixel images, preferably a weighted average is calculated based on a feature quantity in a pixel of the input image and a degree of similarity to a feature quantity of a superpixel corresponding to a pixel. In the image processing device, preferably the similarity map generator generates the first and second similarity maps by calculating a weighted average of the plurality of similarity maps that are generated from the plurality of superpixel images based on the first and second algorithms, and a weight of the weighted average increases as a feature quantity of a pixel in the image acquired by the image acquisition unit is closer to a feature quantity of a superpixel to which the pixel belongs.

Through the technique, the similarity map can be accurately obtained in units of pixels from the similarity map obtained in units of superpixels.

In the image processing device, preferably the similarity map generator generates the first and second similarity maps by performing weighting around an object position detected in the image to a calculated degree of similarity. The object position can be obtained as a region having a small degree of similarity in the similarity map.

In this manner, a large weight is not added to the center of the image, but the weight increases toward the center of the object. Therefore, a similarity map reflecting the center of the object is improved.

In the image processing device, preferably the saliency map generator calculates a likelihood from the first similarity map and the second similarity map with the first similarity map as a first prior probability, calculates a first saliency map representing a posterior probability of a salient region based on the first prior probability and the likelihood, calculates a likelihood from the second similarity map and the first similarity map with the second similarity map as a second prior probability, calculates a second saliency map representing a posterior probability of a salient region based on the second prior probability and the likelihood, and integrates the first saliency map and the second saliency map to generate a final saliency map.

In this manner, the posterior probabilities of the saliency measures (foreground probabilities) are obtained with the first and second similarity maps as the prior probabilities, as such, saliency maps having several types of information integrated is obtained from the similarity maps. In the present technique, the saliency measure can be more uniform for the salient object.

An example embodiment of the present invention can be understood as an image processing device including at least a part of the above configuration. An example embodiment of the present invention can be understood as an image processing device controlling method and a saliency map generating method, which include at least a part of the above processing, a program causing a computer to perform the image processing device controlling method and the saliency map generating method, and a computer-readable recording medium in which the program is non-transiently stored. An example embodiment of the present invention can be configured by a combination of the configurations and processing unless technical inconsistency is generated.

Accordingly, in an example embodiment of the present invention, a saliency measure can be accurately evaluated even for one still image with no need for previous knowledge based on learning.

The invention claimed is:

1. An image processing device comprising:
a processing unit configured to operate as
an image acquisition unit configured to acquire an image;
a similarity map generator configured to calculate, with a region constructed with one or a plurality of pixels in the image as a constituent unit, a first similarity map based on a first algorithm, the first similarity map representing a degree of similarity between the region and a marginal region of the image, and calculate a second similarity map based on a second algorithm, the second similarity map representing a degree of similarity between the region and the marginal region of the image; and
a saliency map generator configured to integrate the first similarity map and the second similarity map to generate a saliency map.

2. The image processing device according to claim 1, wherein the similarity map generator reconfigures a target region based on the marginal region, and generates the first and second similarity maps with consideration that the degree of similarity increases with decreasing reconfiguration error.

3. The image processing device according to claim 1, wherein the first algorithm
calculates a plurality of eigenvectors by performing a principal component analysis to a feature quantity of the marginal region,
reconfigures a feature quantity of the target region by a linear combination of the plurality of eigenvectors, and
performs calculation such that the degree of similarity increases with decreasing reconfiguration error.

4. The image processing device according to claim 1, wherein the second algorithm,
based on approximation of the feature quantity of the target region by using a combination of smallest possible number of feature quantities of marginal regions, reconfigures the feature quantity of the target region by a linear combination of the feature quantities of the marginal regions using a factor having a minimum cost function, and
performs calculation such that the degree of similarity increases with decreasing reconfiguration error.

5. The image processing device according to claim 1, further comprising a superpixel image generator configured to generate a superpixel image by dividing the image acquired by the image acquisition unit into regions, each of which is constructed with a plurality of pixels coupled to each other based on a feature quantity of the pixel, wherein
the similarity map generator generates the first and second similarity maps based on the superpixel image.

6. The image processing device according to claim 5, wherein the superpixel image generator generates a plurality of superpixel images having different superpixel numbers, and
the similarity map generator
generates a similarity map from each of the plurality of superpixel images based on the first algorithm, and integrates the plurality of similarity maps to generate the first similarity map, and
generates a similarity map from each of the plurality of superpixel images based on the second algorithm, and integrates the plurality of similarity maps to generate the second similarity map.

7. The image processing device according to claim 6, wherein the similarity map generator generates the first and second similarity maps after performing smoothing processing on the similarity maps that are generated based on the first and second algorithms from the plurality of superpixel images, and in the smoothing processing, the superpixel images used to generate the similarity maps are clustered to smooth a degree of similarity in each cluster.

8. The image processing device according to claim 6, wherein the similarity map generator generates the first and second similarity maps by calculating a weighted average of the plurality of similarity maps that are generated from the plurality of superpixel images based on the first and second algorithms, and a weight of the weighted average increases as a feature quantity of a pixel in the image acquired by the image acquisition unit is closer to a feature quantity of a superpixel to which the pixel belongs.

9. The image processing device according to claim 7, wherein the similarity map generator generates the first and second similarity maps by calculating a weighted average of the plurality of similarity maps that are generated from the plurality of superpixel images based on the first and second algorithms, and a weight of the weighted average increases as a feature quantity of a pixel in the image acquired by the image acquisition unit is closer to a feature quantity of a superpixel to which the pixel belongs.

10. The image processing device according to claim 1, wherein the similarity map generator generates the first and second similarity maps by performing weighting around an object position detected in the image to the calculated degree of similarity.

11. The image processing device according to claim 1, wherein the saliency map generator calculates a likelihood from the first similarity map and the second similarity map with the first similarity map as a prior probability, and calculates a first saliency map representing a posterior probability of a salient region from the prior probability and the likelihood, calculates a likelihood from the second similarity map and the first similarity map with the second similarity map as a prior probability, and calculates a second saliency map representing a posterior probability of a salient region from the prior probability and the likelihood, and integrates the first saliency map and the second saliency map to generates a final saliency map.

12. An image processing method performed by a computer, the image processing method comprising the steps of:

acquiring an image;

calculating, with a region constructed with one or a plurality of pixels in the image as a constituent unit, a first similarity map based on a first algorithm, the first similarity map representing a degree of similarity between the region and a marginal region of the image, and calculating a second similarity map based on a second algorithm, the second similarity map representing a degree of similarity between the region and the marginal region of the image; and integrating the first similarity map and the second similarity map to generate a saliency map.

13. A non-transitory computer readable medium having stored thereon a program causing a computer to execute each step of the image processing method according to claim 12.

* * * * *